(12) United States Patent
Devereaux

(10) Patent No.: US 12,455,175 B2
(45) Date of Patent: Oct. 28, 2025

(54) SYSTEMS AND METHODS FOR ORPHANED SENSOR DISCOVERY AND REPORTING

(71) Applicant: Aclara Technologies LLC, St. Louis, MO (US)

(72) Inventor: Peggy Rose Devereaux, Saint Louis, MO (US)

(73) Assignee: Aclara Technologies LLC, St. Louis, MO (US)

(*) Notice: Subject to any disclaimer, the term of this patent is extended or adjusted under 35 U.S.C. 154(b) by 0 days.

(21) Appl. No.: 18/142,300

(22) Filed: May 2, 2023

(65) Prior Publication Data

US 2023/0349726 A1    Nov. 2, 2023

Related U.S. Application Data

(60) Provisional application No. 63/349,534, filed on Jun. 6, 2022, provisional application No. 63/337,524, filed on May 2, 2022.

(51) Int. Cl.
*G01D 4/00* (2006.01)
*G01D 4/02* (2006.01)
(Continued)

(52) U.S. Cl.
CPC .............. *G01D 4/004* (2013.01); *G01D 4/02* (2013.01); *G01N 33/225* (2013.01);
(Continued)

(58) Field of Classification Search
CPC .. H04Q 9/00; H04Q 2209/00; H04Q 2209/10; H04Q 2209/20; H04Q 2209/40; H04Q 2209/43; H04Q 2209/60; H04Q 2209/70; H04Q 2209/80; H04Q 2209/82; H04Q 2209/826; H04Q 2209/84;
(Continued)

(56) References Cited

U.S. PATENT DOCUMENTS 9,497,690 B2 * 11/2016 Kim ..................... H04W 52/367
10,142,816 B2 * 11/2018 Cavendish .............. H04W 4/70
(Continued)

OTHER PUBLICATIONS

PCT/US2023/020691 International Search Report and Written Opinion dated Aug. 17, 2023 (16 pages).

*Primary Examiner* — Franklin D Balseca
(74) *Attorney, Agent, or Firm* — Michael Best & Friedrich LLP

(57) ABSTRACT

A utility sensor module includes one or more sensors, a communication link, and an electronic processor. The electronic processor is configured to broadcast an advertisement signal associated with a communication protocol for a first transmission time. The advertisement signal is configured to cause an external device to transmit a response message. The electronic processor is further configured to determine whether the response message is received within a predetermined time period, and in response to determining that the response message was not received within the predetermined time period, operating in a modified sleep mode. Operating in the modified sleep mode includes modifying the operation of the communication interface to broadcast the advertisement signal at a periodic interval, such that the advertisement signal is only broadcast at the periodic interval for a second transmission time.

18 Claims, 7 Drawing Sheets

(51) Int. Cl.
  *G01N 33/22*  (2006.01)
  *H04H 60/31*  (2008.01)
  *H04H 60/37*  (2008.01)

(52) U.S. Cl.
  CPC .......... *H04H 60/31* (2013.01); *H04H 60/375* (2013.01); *H04Q 2209/00* (2013.01); *H04Q 2209/883* (2013.01)

(58) Field of Classification Search
  CPC ......... H04Q 2209/88; H04Q 2209/883; G01D 4/00; G01D 4/002; G01D 4/004; G01D 4/02; H04H 60/31; H04H 60/375; G01N 33/225
  See application file for complete search history.

(56) References Cited

U.S. PATENT DOCUMENTS

| | | | |
|---|---|---|---|
| 11,204,612 B2* | 12/2021 | von Flotow | G05D 1/0661 |
| 2008/0100393 A1* | 5/2008 | Nuytkens | H04L 27/12 331/46 |
| 2011/0066297 A1 | 3/2011 | Saberi et al. | |
| 2015/0003227 A1 | 1/2015 | Splitz et al. | |
| 2016/0066249 A1 | 3/2016 | Dukes et al. | |
| 2018/0317169 A1 | 11/2018 | Splitz et al. | |
| 2021/0335117 A1* | 10/2021 | Duggan | G01S 19/01 |
| 2022/0094198 A1 | 3/2022 | Toulgoat-Dubois | |

* cited by examiner

150
SYSTEMS AND METHODS FOR ORPHANED SENSOR DISCOVERY AND REPORTING

CROSS-REFERENCE TO RELATED APPLICATIONS

This application claims priority to, and the benefit of, U.S. Provisional Patent Application No. 63/337,524 filed May 2, 2022, and U.S. Provisional Patent Application No. 63/349,534 filed Jun. 6, 2022, the contents of both which are incorporated herein in their entirety.

FIELD

Embodiments of the disclosure relate to controlling utility sensing systems during various operations and, more particularly, to discovering and/or reporting sensors within a system that are not in communication with a utility, such as via a receiving unit or other communication device.

BACKGROUND

Connected or smart utility meters and/or sensors are increasingly common in utility systems, e.g., gas, electric, water, etc. These connected sensors allow for data to be provided directly to a central utility system for processing, billing, maintenance, etc. In some facilities or other installations there may be multiple smart utility meters and/or sensors, which in turn are configured to communicate with a central utility system. Often, these smart devices communicate with the central utility system via an intermediate device. In some cases, one or more of the smart devices may not establish communication with one or more intermediate devices or may subsequently lose their communication link. In these instances, the smart devices are generally determined to be orphaned. In some system, these orphaned devices may not be discovered or reported absent manual verification. As the smart devices are orphaned, they are unable to report sensed parameters to the facility and/or utility system. Thus, systems and processes for discovering and/or reporting orphaned sensors to a facility operator and/or utility would be beneficial.

SUMMARY

The systems and methods described herein provide systems and methods for discovering orphaned devices within a facility or other network. These discovered orphaned devices may then be reported to a facility and/or utility such that maintenance personnel are able to be dispatched or otherwise informed of the orphaned device such that the orphaned device can be replaced or linked to the communication network.

In one embodiment, a utility sensor module includes one or more sensors, a communication link, and an electronic processor. The electronic processor is configured to broadcast an advertisement signal associated with a communication protocol for a first transmission time. The advertisement signal is configured to cause an external device to transmit a response message. The electronic processor is further configured to determine whether the response message is received within a predetermined time period, and in response to determining that the response message was not received within the predetermined time period, operate in a modified sleep mode. Operating in the modified sleep mode includes modifying the operation of the communication interface to broadcast the advertisement signal at a periodic interval, such that the advertisement signal is only broadcast at the periodic interval for a second transmission time.

In another embodiment, a method for changing an operational mode of a sensor module is described. The method includes broadcasting an advertisement signal associated with a communication protocol for a first transmission time. The advertisement signal is configured to cause an external device to transmit a response message. The method further includes determining whether the response message is received within a predetermined time period. The method also includes modifying an operation of the utility sensor module to operate in a modified sleep mode in response to determining that the response message is not received within the predetermined time period, wherein operating in the modified sleep mode includes modifying the operation of the sensor module to broadcast the advertisement signal at a periodic interval, such that the advertisement signal is only broadcast at the periodic interval for a second transmission time.

In another embodiment, a utility system is described that includes a sensor module and a receiving device. The sensor module includes one or more sensors and an electronic processor. The electronic processor is configured to broadcast an advertisement signal associated with a communication protocol for a first transmission time and determine whether the response message is received within a predetermined time period. The electronic processor is further configured to, in response to determining that the response message is not received within the predetermined time period, operate in a modified sleep mode. Operating in the modified sleep mode comprises modifying the operation of the communication interface to broadcast the advertisement signal at a periodic interval, such that the advertisement signal is only broadcast at the periodic interval for a second transmission time. The receiving device includes an electronic processor configured to transmit the response message in response to receiving the advertisement signal.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claims and explain various principles and advantages of those embodiments.

Figure 1:
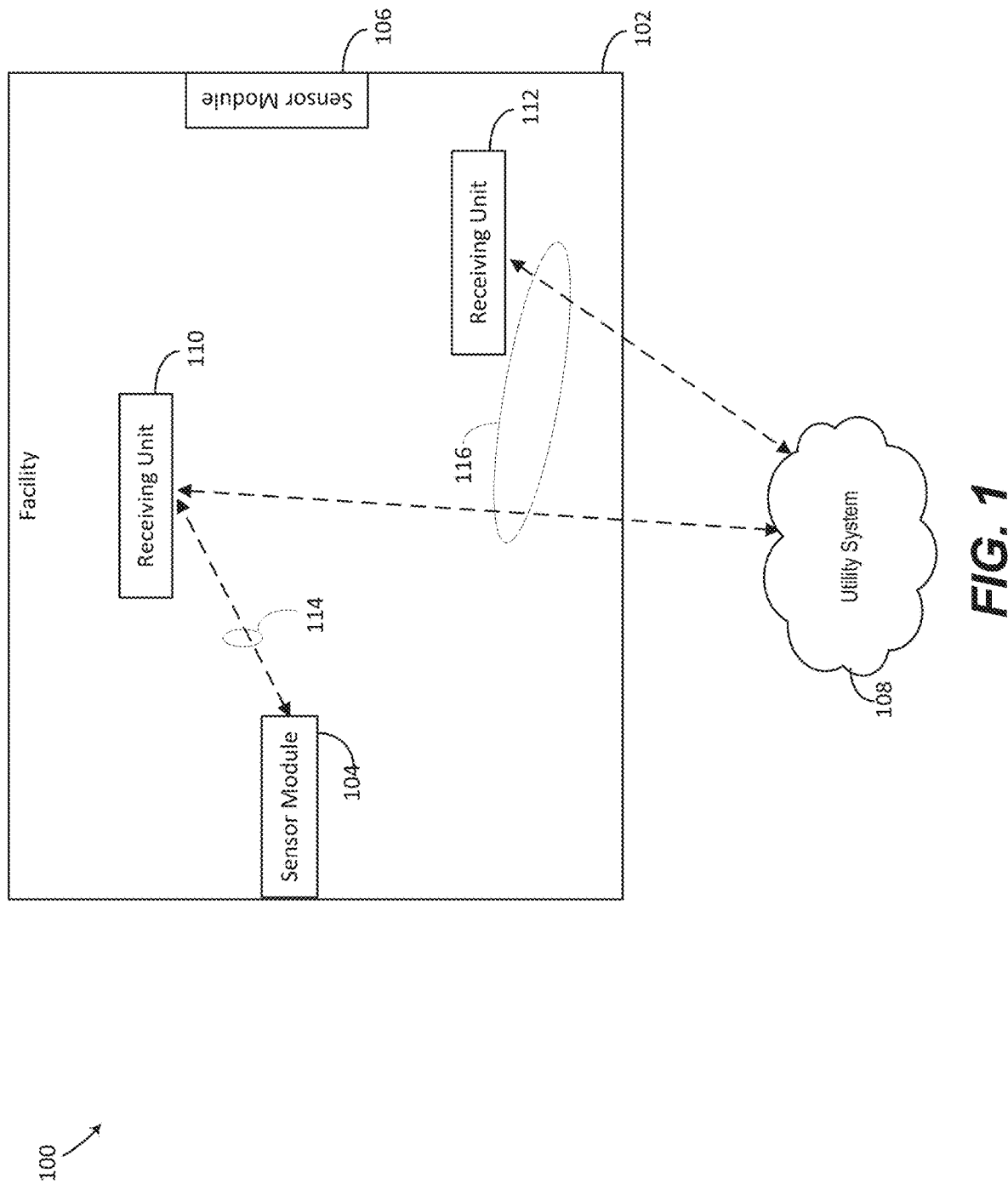
FIG. 1 is a diagram of a general utility system, according to some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Before any embodiments of the disclosure are explained in detail, it is to be understood that the disclosure is not limited in its application to the details of construction and the arrangement of components set forth in the following description or illustrated in the accompanying drawings. The disclosure is capable of other embodiments and of being practiced or of being carried out in various ways.

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing specific functionality may also perform additional functionality not described herein. For example, a device or structure that is "configured" in a certain way is configured in at least that way but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used herein, "non-transitory computer-readable medium" includes all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

Also, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

FIG. 1 illustrates a general utility system 100, according to some embodiments. The system 100 may include a facility 102 having one or more connected utility sensor modules, such as sensor modules 104, 106. The facility 102 may include various types of facilities, such as commercial, residential, industrial, and the like. While the facility 102 is shown with only sensor modules 104, 106, it is understood that different facilities may have multiple sensor modules of various types. Example sensor modules 104, 106 may be various sensor types, such as methane sensor modules, moisture sensor modules, temperature sensor modules, electrical arc detection modules, gas concentration sensor modules, water level sensor modules, and/or other sensor modules as required for a given application.

The sensor modules 104, 106, as described above, may be configured to sense one or more parameters associated with a utility system, such as gas (e.g., methane), moisture, temperatures, currents, voltages, electrical arcs, water or other liquid levels, gas pressures, and/or other parameters associated with a given utility system. For purposes of this application, the sensor modules 104, 106 will generally be discussed with respect to a methane gas sensor. However, it is understood that other sensor types may be used in lieu of, or in addition to, a methane gas sensor. The sensor modules 104, 106 may be configured to communicate with a utility system 108. The utility system 108 may be or include a server or cloud-based system which allows the utility to monitor and/or control various aspects of an associated utility network.

As shown in FIG. 1, the sensor modules 104, 106 are generally configured to communicate with the utility system 108 via one or more receiving units 110, 112. The receiving units 110, 112 may receive communications from the sensor modules 104, 106 using a first communication protocol 114, such as Bluetooth, and communicate the data received from the sensor modules 104, 106 to the utility system 108 via a second communication protocol 116, such as cellular, Wi-Fi, etc. Thus, the receiving units 110, 112 provide longer range communication to the utility system 108. This is advantageous where the sensor modules 104, 106 are powered via an on-board power source, such as a battery. By relying on lower power communication protocols to communicate locally to the one or more receiving units 110, 112, battery life, and therefore, operating time of the sensor modules 104, 106 may be increased. In some embodiments, the receiving units 110, 112 are positioned at fixed locations within the facility 102. However, in other embodiments, the receiving units 110, 112 may be mobile devices, and may be moved about the facility. For example, the receiving units 110, 112 may be carried by one or more personnel within a facility.

As shown in FIG. 1, in some instances a sensor module, such as sensor module 106, may not be in communication with any of the receiving units 110, 112. In some instances, this may be referred to as an orphaned sensor module. This may be the result of the sensor module 106 not establishing a communication link during an initial setup of the sensor module 106. In still other instances, the communication link between the sensor module 106 and the one or more receiving units 110, 112 may be lost during operation, such as by a receiving unit 110, 112 moving out of range of the sensor module 106, interference generated by one or more other devices within the facility, physical objects placed in a communication path of the sensor module 106, etc. Accordingly, the sensor module 106 is unable to communicate with the utility system 108 as no communication path is available via the one or more receiving units 110, 112. As will be described in more detail below, this may result in the sensor module 106 entering a sleep mode and not attempting to reestablish communication with the one or more receiving units 110, 112. Additionally, the utility system 108 may not be able to determine that the sensor module 106 is not providing information to the utility system 108, particularly where the sensor module 106 was unable to initially establish a communication path to the utility system 108 via the receiving units 110, 112. This may result in the utility system 108 not receiving sensed data as desired and/or required for a given application. Additionally, where the utility system 108 determines that one or more sensor modules, such as sensor module 106, are not communicating with the utility system, personnel may be dispatched to repair or replace the sensor module 106, thereby increasing maintenance cost.

Figure 2:
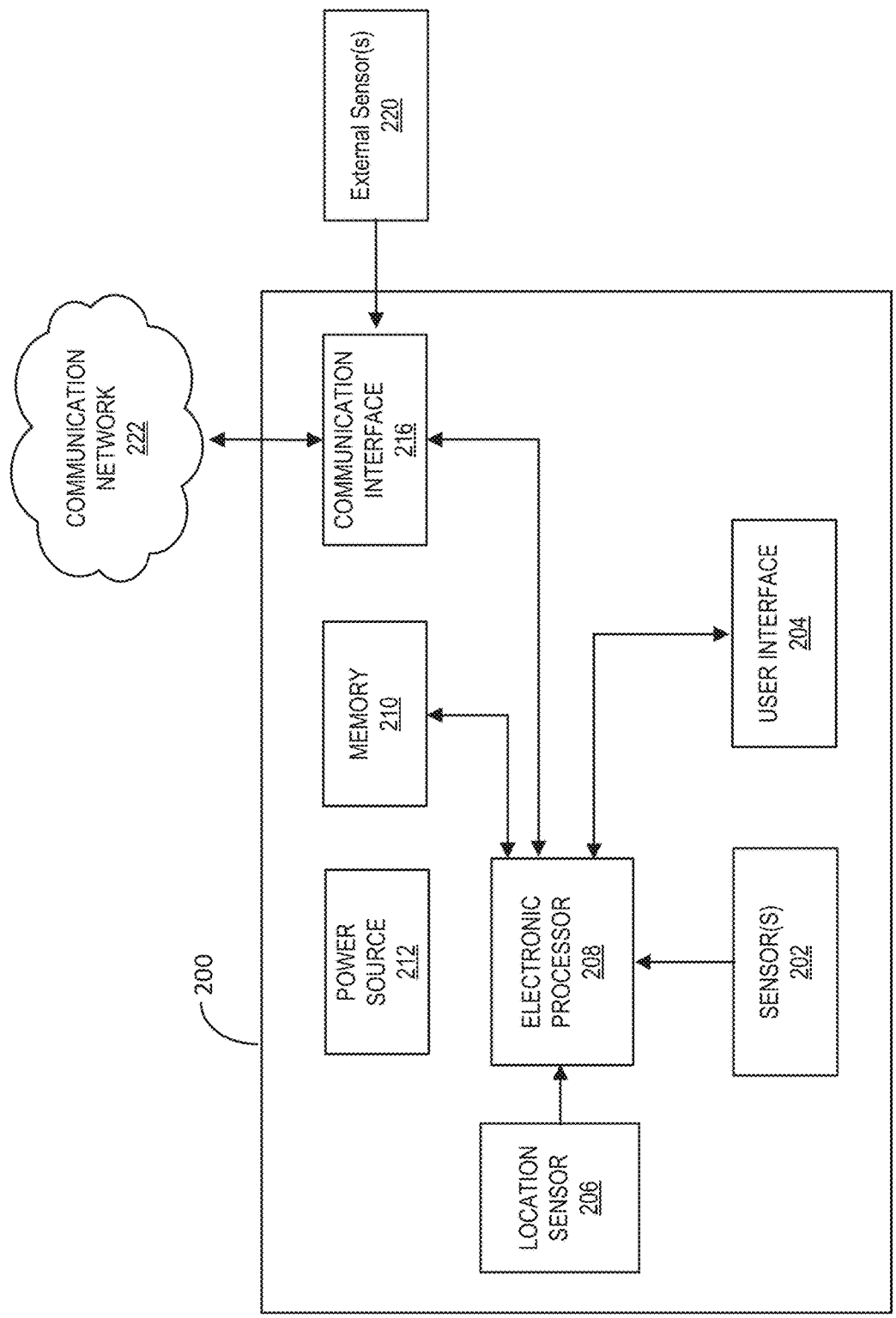
FIG. 2 is a block diagram of a utility sensor module, according to some embodiments.

FIG. 2 is a block diagram of a sensor module 200, according to some embodiments. The sensor module 200 may be similar to the sensor modules 104, 106 described above in regard to FIG. 1 and should be understood to be able to be used interchangeably herein. Each sensor module 200 may contain a housing (not shown) that is environmentally sealed. Such a housing may be manufactured with any suitable materials, including materials used for components used in exterior locations, such as external utility systems (meters, power lines, substations, etc.).

The sensor module 200 may include one or more sensors 202. The sensors 202 may include gas detection sensors, gas concentration sensors, pressure sensors, voltage sensors, current sensors, temperature sensors, light sensors, corrosion detection sensors, chemical presence sensors, flow sensors, tilt sensors, vibration sensory, acceleration sensors, velocity sensors, volumetric sensors, pH sensors, conductivity sensors, oxidation sensors, chlorine sensors, chlorophyll sensors, algae sensors, humidity sensors, resistance sensors, inductance sensors, level sensors, sounds/acoustic sensors, proximity sensors, or other sensor as required for a given application. In one embodiment, the sensors 202 may be any sensors used in the gas, water, wastewater, or electric utility space. The sensor module 200 may further include a user interface 204. The user interface 204 may include one or more inputs to allow a user, such as a technician, to control, modify, or otherwise provide instructions to the sensor module 200, as will be described in more detail below. In some examples, the user interface 204 may further include a display to provide a visual indication of one or more parameters of the sensor module 200, such as communication status, sensor readings, configuration data, and/or other information as appropriate for a given application. In some embodiments, the display may serve as both an input device and an output device, such as where the display is a touchscreen device. The sensor module 200 may further include a location sensor 206 (e.g., GPS, Glonass). The location sensor 206 may provide a location of the sensor module 200.

As illustrated in FIG. 2, the sensor module 200 further includes an electronic processor 208, a memory 210, a power source 212, and a communication interface 216. The sensors 202 and the location sensor 206 are configured to provide one or more sensed values to the electronic processor 208. The user interface 204 may both provide input to, and receive an output from, the electronic processor 208.

The memory 210 may include read only memory (ROM), random access memory (RAM), other non-transitory computer-readable media, or combinations thereof. The electronic processor 208 is configured to communicate with the memory 210 to store data and retrieve stored data. The electronic processor 208 is configured to receive instructions and data from the memory 210 and execute, among other things, various instructions, processes, applications, or the like. In particular, the electronic processor 208 executes instructions stored in the memory 210 to perform one or more of the processes described herein.

In one embodiment, the power source 212 is configured to provide power to the various components of the sensor module 200. In some embodiments, the sensor module 200 receives external power and the power source 212 converts and distributes the external power to the various components of the sensor module 200. In some examples, the power source 212 includes a battery. In some instances, the battery may be the sole power source, or may be configured to provide backup power when external power is not available.

The communication interface 216 (e.g., a transceiver) allows for communication between the electronic processor 208 and one or more external devices, such as one or more external sensors 220. The external sensors 220 may be remote sensors configured to operate with the sensor module 200, such as gas sensors, pressure sensors, moisture sensors, temperature sensors, or other sensor as described herein. The external sensors 220 may be used when the sensor module 200 cannot easily be placed in proximity to the required location of the sensor, or where the location of the sensor would prevent the sensor module 200 from being able to communicate with the utility network, or where the location of the sensor is within another component, such as a pipe. Additionally, the communication interface 216 may be configured to communicate with the sensor via a wired connection, and in some examples may provide power to the external sensor(s) 220, such as from the power source 212.

The communication interface 216 may further provide communication with other external devices, such as the receiving units 110, 112 (FIG. 1) via a communication network 222. The receiving units 110, 112 (FIG. 1), in turn, may provide a communication path between the sensor module 200 and a utility system 108 (FIG. 1). In some embodiments, the communication interface 216 may include separate transmitting and receiving components. In one embodiment, the communication interface 216 is a wireless transceiver that encodes information received from the electronic processor 208 into a carrier wireless signal and transmits the encoded wireless signal to one or more external devices and/or communication networks, as described above. The communication interface 216 also decodes information received from one or more external devices and provides the decoded information to the electronic processor 208.

The communication interface 216 may communicate with devices and/or networks via various communication protocols, such as using a power line network or a wireless network (e.g., BLUETOOTH®, Wi-Fi, Wi-Max, cellular (3G, 4G, 5G, LTE), RF, LoRa, Zigbee, and/or other wireless communication protocols applicable to a given system or installation). In one embodiment, the communication interface 216 may use a proprietary wireless communication protocol, such as Aclara RF from Aclara Technologies, LLC. Furthermore, in one embodiment, the communication interface 216 may communicate using a combination of communication protocols, such as those described above. For example, the communication interface 216 may be configured to communication via a combination of cellular, BLUETOOTH, and a power line network, thereby allowing for the communication interface to communicate with multiple devices, such as the communication network 222, the external sensors 220, and/or the receiving units 110, 112 (FIG. 1). However, other combination of communication protocols are also applicable as appropriate for a given application.

Figure 3:
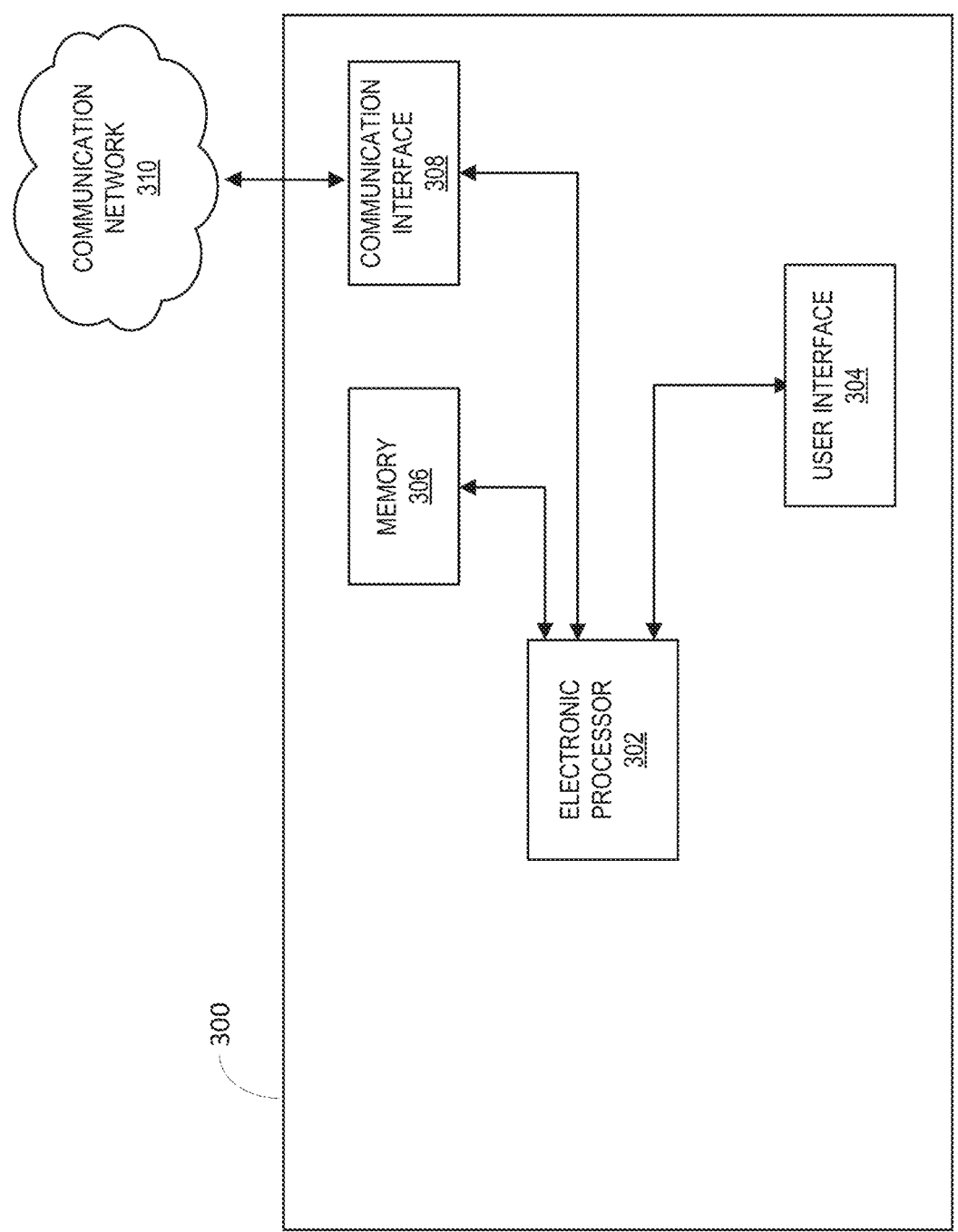
FIG. 3 is a block diagram of a receiving unit device, according to some embodiments.

Turning now to FIG. 3, a block diagram illustrating an example receiving unit 300 is shown, according to some embodiments. The receiving unit 300 may be similar to the receiving units 110, 112 (FIG. 1) and should be understood to be interchangeable herein. The receiving unit 300 may include an electronic processor 302, a user interface 304, a memory 306, and a communication interface 308. The memory 306 may include read only memory (ROM), random access memory (RAM), other non-transitory computer-readable media, or combinations thereof. The electronic processor 302 is configured to communicate with the memory 306 to store data and retrieve stored data. The electronic processor 302 may be further configured to receive instructions and data from the memory 306 and execute, among other things, various instructions, processes, application, etc. In particular, the electronic processor 302 executes instructions stored in the memory 306 to perform one or more of the processes described herein.

The communication interface 308 (e.g., a transceiver) allows for communication between the electronic processor 302 and one or more external devices, such as one or more sensor modules 200 (FIG. 2). The communication interface 308 may communicate with the sensor module 200 (FIG. 2) via the communication interface 216 of the sensor module 200. The communication interface 308 may further communicate with a communication network, such as communication network 310, to allow for communication with a utility system, such as utility system 108 (FIG. 1). The communication interface 308 may also communicate with devices and/or networks via various communication protocols, such as using a power line network or a wireless network (e.g., BLUETOOTH®, Wi-Fi, Wi-Max, cellular (3G, 4G, 5G, LTE), RF, LoRa, Zigbee, and/or other wireless communication protocols applicable to a given system or installation). In one embodiment, the communication interface 308 may use a proprietary wireless communication protocol, such as Aclara RF from Aclara Technologies, LLC. Furthermore, in one embodiment, the communication interface 308 may communicate using a combination of communication protocols, such as those described above.

The user interface 304, may allow a user, such as a technician, to receive outputs from the receiving unit 300 or provide inputs to the receiving unit 300. In one example, the receiving unit 300 may receive data from a sensor module 200 (FIG. 2) and display the data via the user interface 304. In further examples, the user may enter various commands (e.g., enter pause mode), or data (e.g., configuration data, communication data, calibration data, firmware updates, etc.) via the user interface 304, which may then be communicated to the sensor module 200 (FIG. 2). The sensor module 200 (FIG. 2) may then provide data such as an acknowledgement signal, parameter changes, etc. back to the receiving unit 300, which can be viewed at the user interface 304. In other embodiments, the display communication link data provided by the sensor module 200 along with various information about the sensor module 200, such as communication address, baud rate, MAC address, or other identifying information. In some examples, the user interface 304 may be a touchscreen device, such as a capacitive touchscreen, an inductive touchscreen, a resistive touchscreen, or other touchscreen type as required for a given application. Thus, the touchscreen can allow for both user inputs, as well as visualization of outputs. In other embodiments, the user interface 304 may include only a display screen and then one or more inputs (e.g., a keyboard, various buttons, softkeys, etc.) to allow the user to provide an input to the receiving unit 300.

Figure 4:
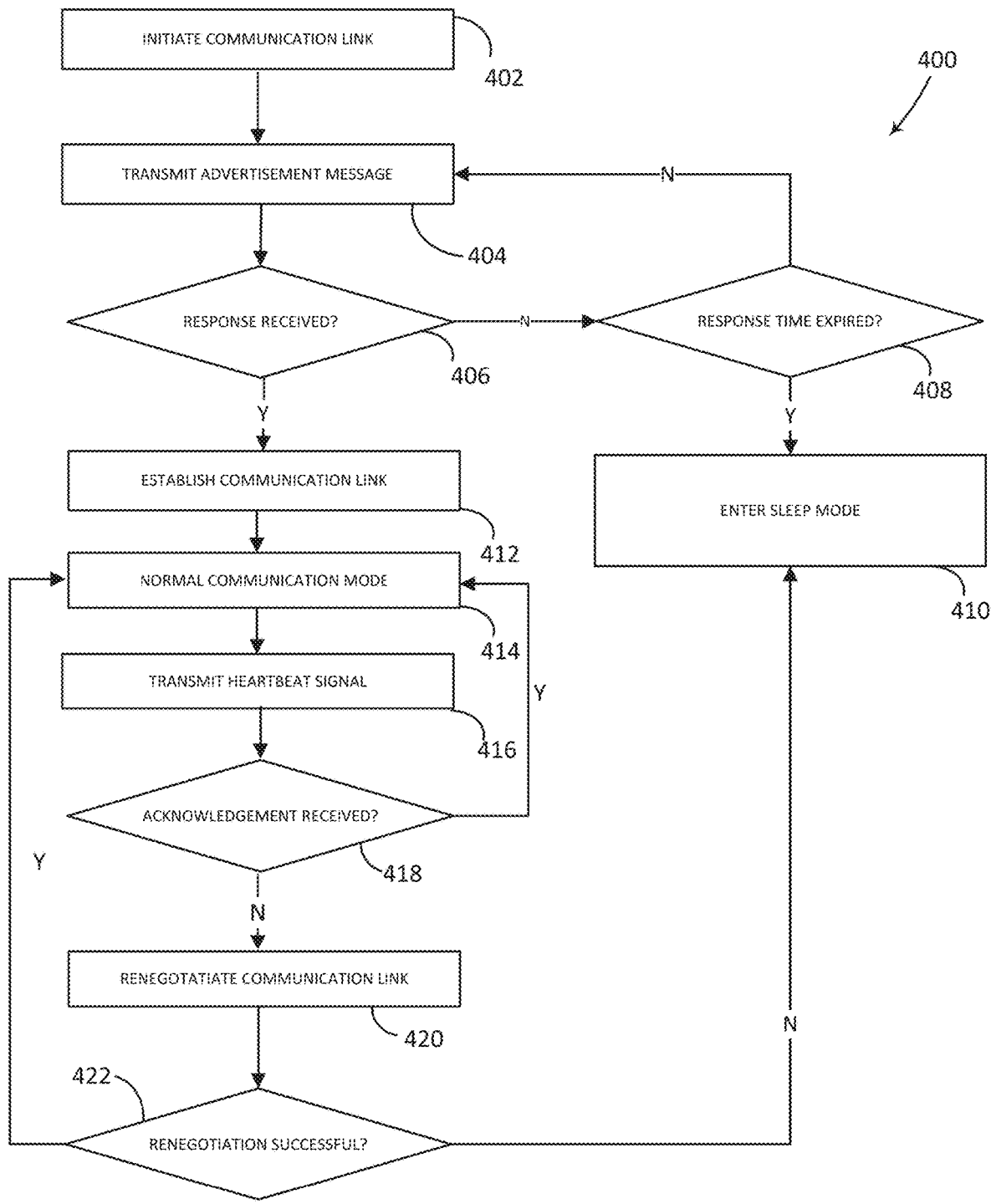
FIG. 4 is a flow chart illustrating a process for a sensor module sleep mode, according to some embodiments.

Turning now to FIG. 4, a flowchart illustrating a sensor module executed process 400 for entering a sleep mode is described, according to some embodiments. The process 400 is performed by a sensor module, such as sensor module 200 (FIG. 2), according to some embodiments. As such, the process 400 is understood to be executed by the sensor module 200 (FIG. 2), except where otherwise noted. For example, the process 400 may be stored in the memory 210 (FIG. 2) and executed by the electronic processor 208 (FIG. 2).

At process block 402, the sensor module 200 initiates a communication link operation to attempt to establish a communication link with one or more receiving units, such as receiving unit 300 (FIG. 3). In one embodiment, a user, such as a technician may instruct the sensor module 200 to initiate the communication link operation, such as via the user interface 204 (FIG. 2). In other examples, the sensor module 200 may automatically attempt to establish a communication link upon being powered on initially. In still other examples, the sensor module 200 may initiate a communication link operation in response to receiving an external command, such as via a receiving unit 300 (FIG. 3). Upon initiating the communication link operation, the sensor module 200 transmits an advertisement message at process block 404. In some examples, the advertisement message is generated based on a communication protocol used by the sensor module 200, such as Bluetooth, LoRa, Zigbee, etc.

Upon or during the transmission of the advertisement message, the sensor module 200 determines whether a response is received from an external device, such as a receiving unit 300 (FIG. 3) described above, at process block 406. The response may be an expected response based on the communication protocol being used and may indicate that the advertisement message transmitted by the sensor module 200 has been received by at least one external device. In response to determining that the response has not been received, the sensor module 200 determines whether the response time has expired at process block 408. In one embodiment, the response time is a predefined time, such as 5 minutes. However, response times of more than 5 minutes or less than 5 minutes are also contemplated. For example, the predefined time may be programmed in the sensor module 200 during manufacturing. Alternatively, a user may set the predefined time via the user interface 204 (FIG. 2). In some embodiments, the response time is based on the type of communication protocol being used by the sensor module 200. For example, where the sensor module 200 uses a Bluetooth communication protocol to communicate with the receiving units 300 (FIG. 3), a response time may be based on one or more standards within the Bluetooth protocol.

In response to determining that the response time has not expired, the sensor module 200 continues to transmit the advertisement message at process block 404. In response to determining that the response time has expired, the sensor module 200 enters a sleep mode at process block 410. When operating in the sleep mode, the sensor module 200 may continue to sense various parameters via the sensors 202 and/or external sensors 220 (FIG. 2); however, the communication interface 216 (FIG. 2) may cease broadcasting advertisement messages and/or communicating via the communication network 222 with other devices, such as receiving units 300 (FIG. 3). This allows the sensor module 200 to conserve energy by preventing the communication interface 216 (FIG. 2) from continually broadcasting the advertisement messages in the event a response is not received. This may be of particular importance where the power source 212 (FIG. 2) of the sensor module is an energy storage device, such as a battery. A sensor module 200 operating in the sleep mode may be referred to as an orphaned sensor module as the sensor module is not in communication with any other device and/or the utility system.

In response to a response being determined to be received at process block 406, a communication link with an external device, such as receiving unit 300 (FIG. 3) is established at process block 412. The communication link may be established based on a standard link establishment process for a given communication protocol, such as Bluetooth, LoRa, Zigbee, etc. Upon establishing the communication link, the sensor module 200 operates in the normal communication mode at process block 414. While operating in the normal communication mode, the sensor module 200 may communicate with one or more external devices, such as receiving units 300 (FIG. 3) using an established communication protocol, as described above.

While operating in the normal communication mode, the sensor module 200 will periodically transmit a heartbeat signal at process block 416. The timing and format of the heartbeat signal will be dependent on the standard for an applicable communication protocol, such as Bluetooth, LoRa, Zigbee, or other communication protocol as appropriate for a required application. Upon transmitting the heartbeat signal, the sensor module 200 determines whether an acknowledgement signal is received at process block 418. The determination of whether the acknowledgement signal is received, the required format of the acknowledgement signal, and/or the time frame in which the acknowledgement signal is required to be received is based on the applicable communication protocol, such as Bluetooth, LoRa, Zigbee, or other communication protocol as appropriate for a required application. In response to receiving the acknowledgement signal, the sensor module 200 continues to operate in the normal communication mode at process block 414.

In response to not receiving the acknowledgement signal, the sensor module 200 will attempt to renegotiate the communication link at process block 420. Renegotiation of the communication link may be performed based on the communication protocol in use by the sensor module, such as Bluetooth, LoRa, Zigbee, or other communication protocol as appropriate for a required application. In some examples, the sensor module 200 may resume transmitting advertisement messages as described above. At process block 422, the sensor module 200 determines whether the renegotiation of the communication link was successful. In response to determining that the renegotiation was successful, the sensor module 200 resumes operating in the normal communication mode at process block 414. In response to determining that the renegotiation of the communication link was not successful, the sensor module enters the sleep mode at process block 410, as described above.

Figure 5:
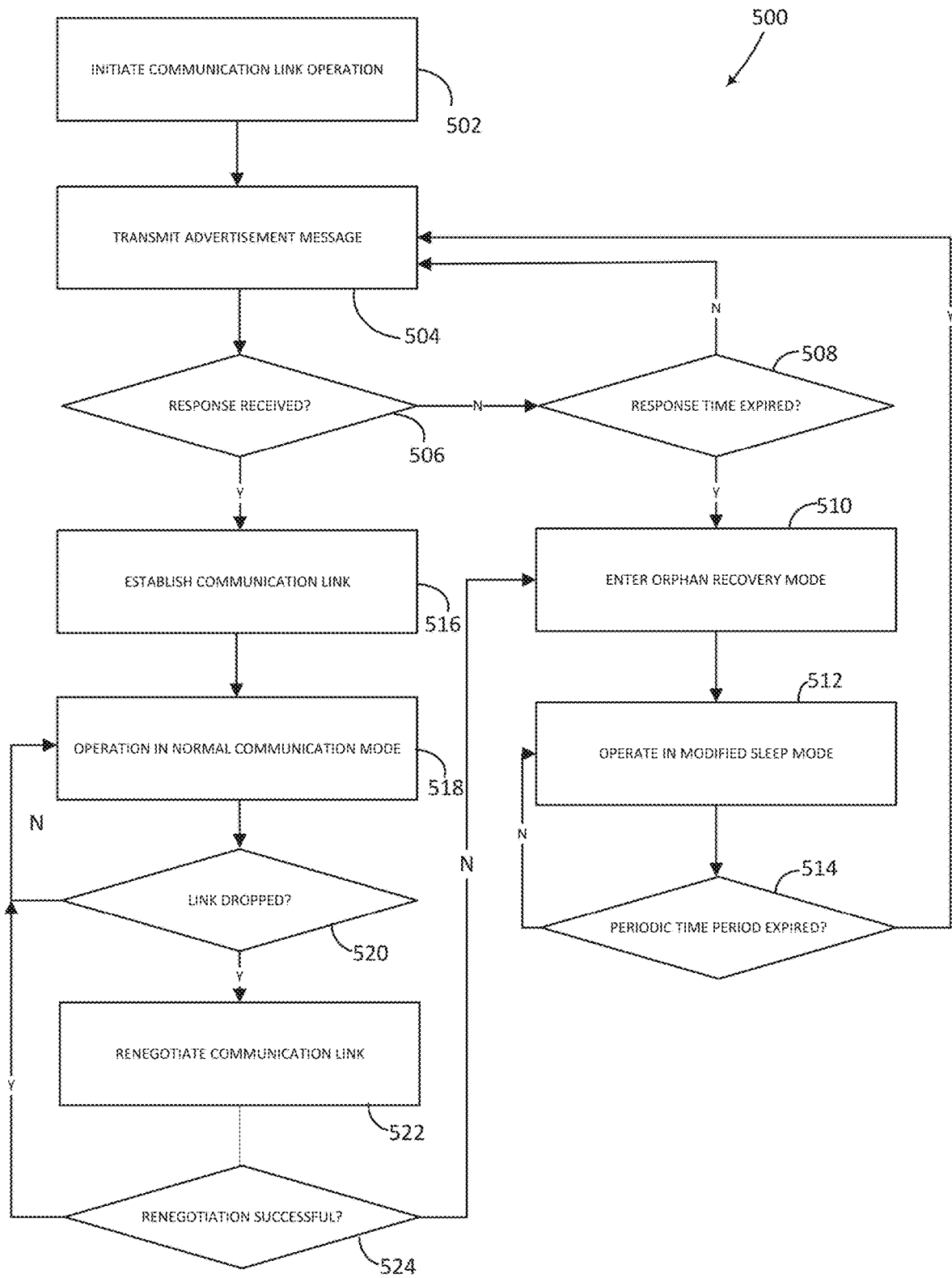
FIG. 5 is a flow chart illustrating a further process for executing an orphaned sensor module recovery mode, according to some embodiments.

Turning now to FIG. 5, a process 500 for a sensor module, such as sensor module 200, to execute an orphan recovery mode is described, according to some embodiments. As such, the process 500 is understood to be executed by the sensor module 200 (FIG. 2), except where otherwise noted. For example, the process 500 may be stored in the memory 210 (FIG. 2) and executed by the electronic processor 208 (FIG. 2).

At process block 502, the sensor module 200 initiates a communication link operation to attempt to establish a communication link with one or more receiving units, such as receiving unit 300 (FIG. 3). In one embodiment, a user, such as a technician may instruct the sensor module 200 to initiate the communication link operation, such as via the user interface 204 (FIG. 2). In other examples, the sensor module 200 may automatically attempt to establish a communication link upon being powered on initially. In still other examples, the sensor module 200 may initiate a communication link operation in response to receiving an external command, such as via a receiving unit 300 (FIG. 3). Upon initiating the communication link operation, the sensor module 200 transmits an advertisement message at process block 504. In some examples, the advertisement message is generated based on a communication protocol used by the sensor module 200, such as Bluetooth, LoRa, Zigbee, etc.

Upon or during the transmission of the advertisement message, the sensor module 200 determines whether a response is received from an external device, such as a receiving unit 300 (FIG. 3) described above, at process block 506. The response may be an expected response based on the communication protocol being used and may indicate that the advertisement message transmitted by the sensor module 200 has been received by at least one external device. In response to determining that the response has not been received, the sensor module 200 determines whether the response time has expired at process block 508. In one embodiment, the response time is a predefined time, such as 5 minutes. However, response times of more than 5 minutes and less than 5 minutes are also contemplated. For example, the predefined time may be programmed in the sensor module 200 during manufacturing. Alternatively, a user may set the predefined time via the user interface 204 (FIG. 2). In some embodiments, the response time is based on the type of communication protocol being used by the sensor module 200. For example, where the sensor module 200 uses a Bluetooth communication protocol to communicate with the receiving units 300 (FIG. 3), the response time may be based on one or more standards within the Bluetooth protocol.

In response to determining that the response time has not expired, the sensor module 200 continues to transmit the advertisement message at process block 504. In response to determining that the response time has expired, the sensor module 200 executes an orphaned sensor module recovery mode at process block 510. The orphaned sensor module recovery mode may be used to modify a sleep mode of the sensor module 200. For example, the orphaned sensor module may modify the sleep mode of the sensor module 200 to allow for the sensor module to temporarily exit the sleep mode and for the communication interface 216 (FIG. 2) to periodically transmit an advertisement message for a modified response time, such as the response time described above. In some embodiments, the modified response time may be the same as the normal response time described above. However, in other embodiments, the modified response time may be varied to reflect the operation in the orphaned sensor module recovery mode. For example, the modified response time may be modified based on the available power to the sensor module 200. For example, where the power source 212 is a power storage device, such as a battery, the modified response time may be determined based on the voltage of the battery. Other characteristics of the battery, such as state-of-charge, state-of-health, etc., may also be used when determining the modified response time. Further, other factors, such as time of day, time since last communication link was established, or other parameter appropriate for a given application may also be used to determine the modified response time.

Additionally, operating in the orphaned sensor module recovery mode may set the periodic advertisement time for waking from a sleep mode to transmit an advertisement message. In some embodiments, the periodic advertisement time may be 5 minutes. However, periodic advertisement times of more than 5 minutes or less than 5 minutes are also contemplated. In one embodiment, the periodic advertisement time is a pre-defined time. In some examples, the periodic advertisement times are dynamically determined based on one or more parameters associated with the sensor module 200. For example, where the power source 212 (FIG. 2) of the sensor module 200 is an energy storage device, such as a battery, the periodic advertisement times may be based on a characteristic of the battery, such as voltage, state-of-charge, state-of-health, etc. For example, as the voltage of the battery drops over time, the periodic advertisement times may increase such that the sensor module 200 exits the sleep mode less often to conserve battery life. However, other factors, such as sensed data type, predetermined user settings, etc., may be used to dynamically determine the periodic advertisement time.

Upon executing the orphaned sensor module recovery mode, the sensor module 200 operates in a modified sleep mode at process block 512. The modified sleep mode may operate similar to the sleep mode described above, with parameters modified as described above with respect to the orphan recovery mode. When operating in the modified sleep mode, the sensor module 200 may continue to sense various parameters via the sensors 202 and/or external sensors 220 (FIG. 2); however, the communication interface 216 (FIG. 2) may cease broadcasting advertisement messages and/or communicating via the communication network 222 with other devices, such as receiving units 300 (FIG. 3) for set time periods (e.g., for the periodic advertisement time as described above). This allows the sensor module 200 to conserve energy by preventing the communication interface 216 (FIG. 2) from continually broadcasting the advertisement messages in the event a response is not received or a communication link is not established.

At process block 514, the sensor module 200 determines whether the periodic time period has expired. In response to determining that the periodic time period has not expired, the sensor module 200 continues to operate in the modified sleep mode at process block 512. In response to determining that the periodic time period has expired, the sensor module transmits the advertisement message at process block 504 and determines whether a response is received at process block 506 as described above.

In response to determining that a response has been received at process block 506, the sensor module 200 establishes a communication link with an external device which provided the response at process block 516. The sensor module 200 then operates in a normal communication mode at process block 518. Operation in the normal communication mode may be similar to that described above with respect to FIG. 4. At process block 520, the sensor module 200 determines whether the communication link has been dropped. The sensor module 200 may determine that the communication link has been dropped based on a transmitted handshake signal not receiving an acknowledgement signal, as described above with respect to FIG. 4. However, other factors may be used to determine that the communication link has been dropped, as required by a given communication protocol used by the sensor module 200.

In response to determining that the communication link has not been dropped, the sensor module continues to operate in the normal communication mode at process block 518. In response to determining that the communication link has been dropped, the sensor module 200 attempts to renegotiate the communication link at process block 522. Renegotiation of the communication link may be performed based on the communication protocol in use by the sensor module, such as Bluetooth, LoRa, Zigbee, or other communication protocol as appropriate for a required application. In some examples, the sensor module 200 may resume transmitting advertisement messages as described above. At process block 524, the sensor module 200 determines whether the renegotiation of the communication link was successful. In response to determining that the renegotiation was successful, the sensor module 200 resumes operating in the normal communication mode at process block 518. In response to determining that the renegotiation was not successful, the sensor module 200 executes the orphaned sensor module recovery mode at process block 510.

Figure 6:
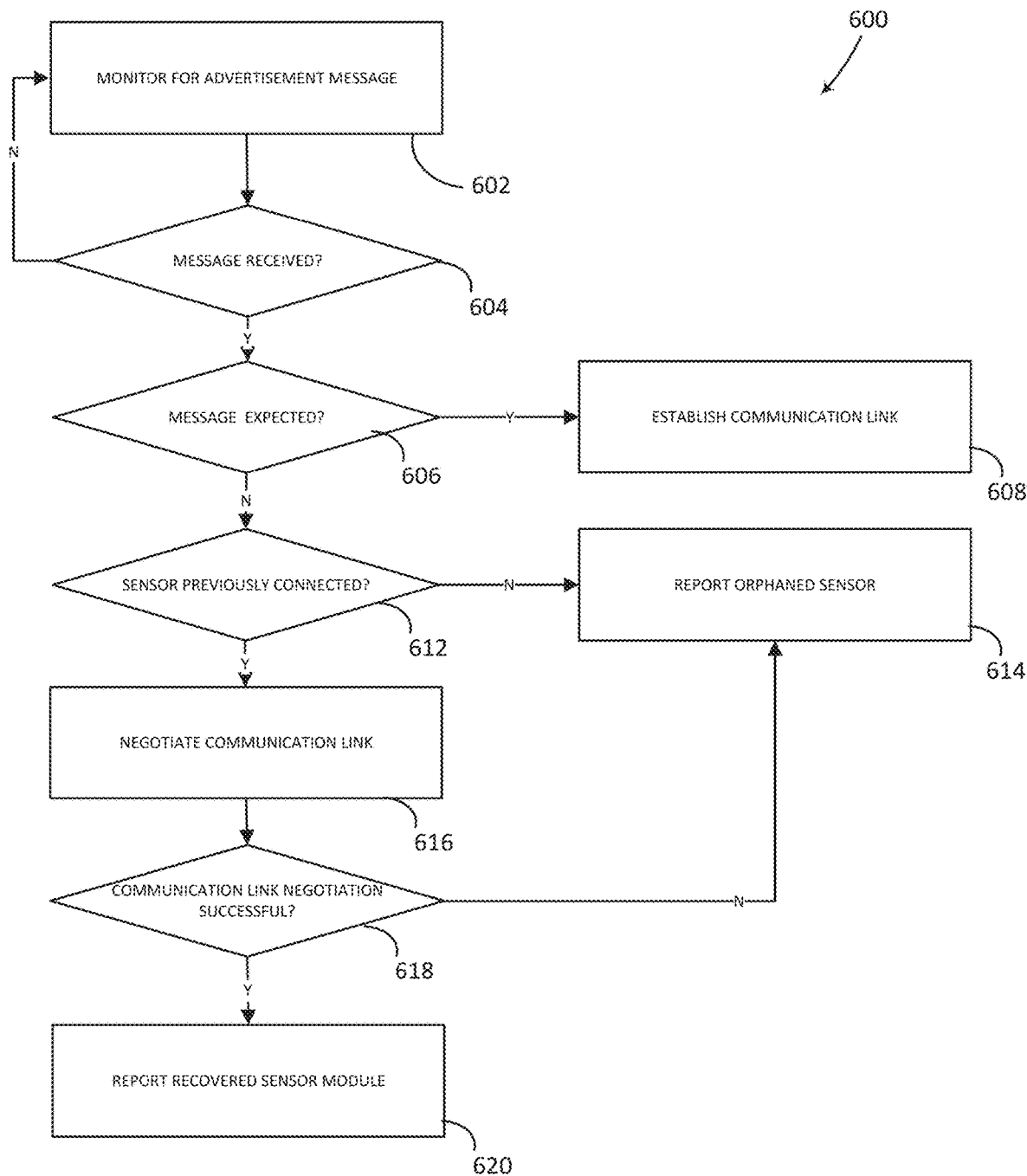
FIG. 6 is a flow chart illustrating a process for detecting an orphaned sensor module, according to some embodiments.

Turning now to FIG. 6, a process 600 for detecting an orphaned sensor module 200 is described, according to some embodiments. In one embodiment, the process 600 is executed by a receiving unit, such as receiving unit 300 (FIG. 3). Accordingly, unless otherwise noted, the process 600 will be described with respect to the receiving unit 300. At process block 602, the receiving unit 300 monitors for an advertisement message from one or more sensor modules 200 (FIG. 2), as described above. In one embodiment, the communication interface 308 (FIG. 3) may monitor for the advertisement message. The receiving unit 300 may be configured to monitor for advertisement messages of a specific communication protocol, such as a communication protocol used by the one or more sensor modules 200, as described above.

At process block 604, the receiving unit 300 determines whether an advertisement message was received. In response to determining that an advertisement message was not received, the receiving unit 300 continues to monitor for advertisement messages at process block 602. In response to determining that an advertisement message was received, the receiving unit 300 determines whether the message was an expected response at process block 606. In some embodiments, the advertisement message may be an expected message where the receiving unit 300 is in an active pairing mode to pair with one or more sensor modules 200 (FIG. 2). In contrast, the advertisement message may be determined to not be an expected message where the receiving unit 300 is not in an active pairing mode and receives the advertisement message while in a general operating mode. In response to determining that the received advertisement message is an expected advertisement message, the receiving unit 300 attempts to establish a communication link with the sensor module transmitting the advertisement message at process block 608. For example, the receiving unit 300 may attempt to establish a communication link by using a communication link process as required for a given communication protocol, such as the communication protocols described above.

In response to determining that the received advertisement message was not an expected advertisement message, the receiving unit 300 determines whether the sensor module 200 transmitting the advertisement message was previously connected to the receiving unit 300 at process block 612. In some embodiments, the receiving unit 300 may determine whether the sensor module 200 transmitting the advertisement message was connected to any receiving units 300 within a given system at process block 612. For example, the receiving unit 300 may query a server or a utility system, such as utility system 108 (FIG. 1) to determine whether the sensor module 200 was previously connected (e.g., has established a communication link) with other receiving units 300.

In response to determining that the sensor module 200 transmitting the advertisement message was not previously connected, the receiving unit 300 reports the sensor module 200 as an orphaned sensor at process block 614. In some embodiments, the receiving unit 300 reports the sensor module 200 as an orphaned sensor to a utility system, such as utility system 108 (FIG. 1). The utility system may then log the orphaned sensor module 200 and may then perform various actions, such as dispatching a maintenance team to repair or replace the orphaned sensor module 200. The receiving unit may report various information about the orphaned sensor module 200, such as an identification of the sensor module 200, a location, or other applicable information provided within the advertisement message. In one embodiment, the utility system, upon receiving the report of the orphaned sensor module 200, may instruct the receiving unit 300 to establish a communication link with the sensor module 200. This may prevent the utility from dispatching maintenance personnel to address the communication issue with the sensor module 200.

In response to determining that the sensor module 200 had previously been in communication with the receiving unit 300 (or other receiving units), the receiving unit 300 attempts to establish a communication link with the sensor module 200 at process block 616. The receiving unit 300 may attempt to establish the communication link using various communication techniques applicable to a given communication protocol, such as those described above. At process block 618, the receiving unit 300 determines whether the communication link was successfully established. In response to determining that the communication link was not successfully established, the receiving unit 300 reports the orphaned sensor module 200 at process block 614, as described above. In response to determining that the communication link was successfully established, the receiving unit 300 operates in a normal communication mode with the sensor module 200 and reports the recovered sensor module 200 to a utility system, such as utility system 108, at process block 620.

Figure 7:
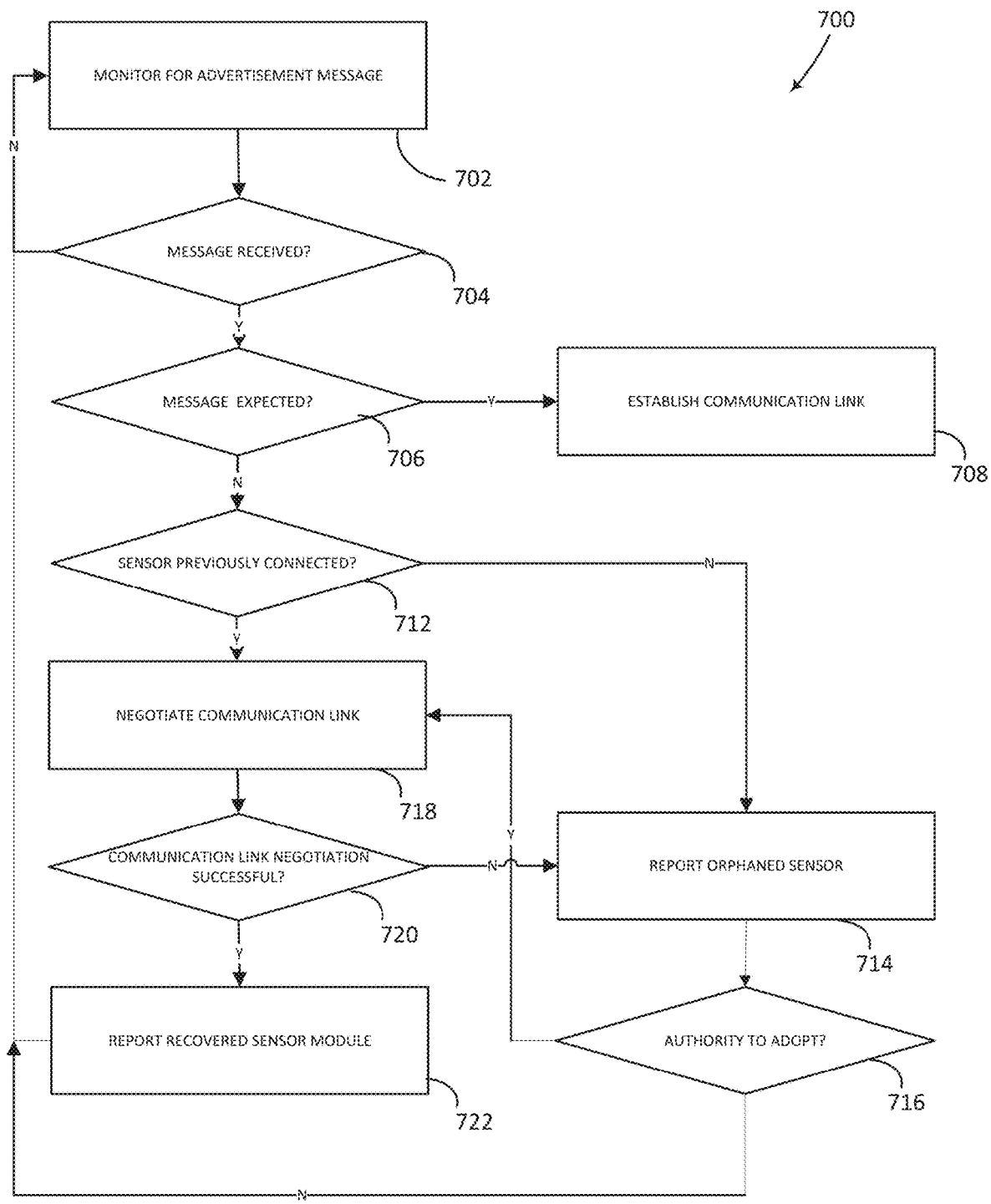
FIG. 7 is a flow chart illustrating a process for adopting an orphaned sensor module, according to some embodiments.

Turning now to FIG. 7, a process 700 for detecting an orphaned sensor module 200 is described, according to some embodiments. In one embodiment, the process 700 is executed by a receiving unit, such as receiving unit 300 (FIG. 3). Accordingly, unless otherwise noted, the process 700 will be described with respect to the receiving unit 300. At process block 702, the receiving unit 300 monitors for an advertisement message from one or more sensor modules 200 (FIG. 2), as described above. In one embodiment, the communication interface 308 (FIG. 3) may monitor for the advertisement message. The receiving unit 300 may be configured to monitor for advertisement messages of a specific communication protocol, such as a communication protocol used by the one or more sensor modules 200, as described above.

At process block 704, the receiving unit 300 determines whether an advertisement message was received. In response to determining that an advertisement message was not received, the receiving unit 300 continues to monitor for advertisement messages at process block 702. In response to determining that an advertisement message was received, the receiving unit 300 determines whether the message was an expected response at process block 706. In some embodiments, the advertisement message may be an expected message where the receiving unit 300 is in an active pairing mode to pair with one or more sensor modules 200 (FIG. 2). In contrast, the advertisement message may be determined to not be an expected message where the receiving unit 300 is not in an active pairing mode and receives the advertisement message while in a general operating mode. In response to determining that the received advertisement message is an expected advertisement message, the receiving unit 300 attempts to establish a communication link with the sensor module transmitting the advertisement message at process block 708. For example, the receiving unit 300 may attempt to establish a communication link by using a communication link process as required for a given communication protocol, such as the communication protocols described above.

In response to determining that the received advertisement message was not an expected advertisement message, the receiving unit 300 determines whether the sensor module 200 transmitting the advertisement message was previously connected to the receiving unit 300 at process block 712. In some embodiments, the receiving unit 300 may determine whether the sensor module 200 transmitting the advertisement message was connected to any receiving units 300 within a given system at process block 712. For example, the receiving unit 300 may query a server or a utility system, such as utility system 108 (FIG. 1) to determine whether the sensor module 200 was previously connected (e.g., has established a communication link) with other receiving units 300.

In response to determining that the sensor module 200 transmitting the advertisement message was not previously connected, the receiving unit 300 reports the sensor module 200 as an orphaned sensor at process block 714. In some embodiments, the receiving unit 300 reports the sensor module 200 as an orphaned sensor to a utility system, such as utility system 108 (FIG. 1). The utility system may then log the orphaned sensor module 200 and may then perform various actions, such as dispatching a maintenance team to repair or replace the orphaned sensor module 200. The receiving unit may report various information about the orphaned sensor module 200, such as an identification of the sensor module 200, a location, or other applicable information provided within the advertisement message. At process block 716, the utility system, upon receiving the report of the orphaned sensor module 200, provides an instruction to the receiving unit 300 that it has authority to "adopt" the orphaned sensor module 200. This may provide the proper authority to the receiving unit to allow for a communication link to be established between receiving unit 300 and the orphaned sensor module 200. This may prevent the utility from dispatching maintenance personnel to address the communication issue with the sensor module 200. In response to the utility system not providing an authority to the receiving unit 300 to adopt the orphaned sensor module 200, the receiving unit continues to monitor for advertisement messages at process block 702. In response the utility system providing an authority for the receiving unit to adopt the orphaned sensor module, the receiving unit attempts to establish a communication link with the orphaned sensor module at process block 718.

Similarly, in response to determining that the sensor module 200 had previously been in communication with the receiving unit 300 (or other receiving units), the receiving unit 300 attempts to establish a communication link with the sensor module 200 at process block 718. The receiving unit 300 may attempt to establish the communication link using various communication techniques applicable to a given communication protocol, such as those described above. At process block 720, the receiving unit 300 determines whether the communication link was successfully established. In response to determining that the communication link was not successfully established, the receiving unit 300 reports the orphaned sensor module 200 at process block 714, as described above. Again, the utility system may provide the receiving unit 300 with authority to adopt at process block 716. In some examples, the utility system may revoke the authority to adopt the orphaned sensor module 200 after a predetermined number of failed communication negotiations.

In response to determining that the communication link was successfully established, the receiving unit 300 reports the recovered sensor module 200 to a utility system, such as utility system 108, at process block 722 and then continues to monitor for advertisement messages at process block 702.

In the foregoing specification, specific embodiments have been described. However, one of ordinary skill in the art appreciates that various modifications and changes may be made without departing from the scope of the disclosure as set forth in the claims below. Accordingly, the specification and figures are to be regarded in an illustrative rather than a restrictive sense, and all such modifications are intended to be included within the scope of present teachings.

Various features and advantages of some embodiments are set forth in the following claims.

What is claimed is:

1. A utility sensing system, comprising:
   a sensor module, comprising:
      one or more sensors; and
      an electronic processor configured to:
         broadcast an advertisement signal associated with a communication protocol for a first transmission time,
         determine whether a response message is received within a predetermined time period, and
         in response to determining that the response message is not received within the predetermined time period, operate in a modified sleep mode, wherein operating in the modified sleep mode comprises modifying an operation of a communication interface to broadcast the advertisement signal at a periodic interval, such that the advertisement signal is only broadcast at the periodic interval for a second transmission time, and
   a receiving device, comprising:
      an electronic processor configured to:
         transmit the response message in response to receiving the advertisement signal;
         determine whether a previous communication link had previously been established with the sensor module,
         establish a new communication link with the sensor module in response to determining that the previous communication link had previously been established with the sensor module, and
         transmit a first status message to a utility server indicating that the sensor module was previously out of communication with the receiving device.

2. The utility sensing system of claim 1, wherein the electronic processor of the receiving device is further configured to:
   receive the advertisement signal from the sensor module,
   determine whether the advertisement signal is an expected advertisement signal.

3. The utility sensing system of claim 1, wherein the electronic processor of the receiving device is further configured to transmit a second status message to the utility server indicating that the sensor module is not in communication with the receiving device in response to determining that the previous communication link had not previously been established with the sensor module.

4. The utility sensing system of claim 1, wherein the electronic processor of the receiving device is further configured to:
   receive the advertisement signal from the sensor module,
   determine whether the advertisement signal is an expected advertisement signal,
   determine whether a communication link has previously been established with the sensor module,
   transmit a message indicating that the sensor module is an orphaned sensor module,
   receive a command authorizing the receiving device to attempt to establish a communication link to the sensor module associated with the received advertisement signal, and
   establish a communication link with the sensor module in response to receiving the command.

5. The utility sensing system of claim 1, wherein the second transmission time is based on a voltage of a battery powering the sensor module.

6. The utility sensing system of claim 1, wherein the electronic processor of the sensor module is further configured to:
   establish the new communication link with the receiving device in response to receiving the response message within the predetermined time period,
   determine whether the new communication link has been dropped,
   attempt to renegotiate the new communication link with the receiving device in response to determining that the new communication link was dropped,
   determine whether the attempted renegotiation of the new communication link was successful, and
   operate in the modified sleep mode in response to determining that the attempt to renegotiate the new communication link was not successful.

7. A method for operating an intermediate communication device in a utility system, comprising:
   receiving an advertisement signal from a sensor module in the utility system;
   determining whether the advertisement signal is an expected advertisement signal;
   transmitting a response message in response to determining that the advertisement signal is the expected advertisement signal;
   determining whether a previous communication link had previously been established with the sensor module;
   establishing a new communication link with the sensor module in response to determining that the previous communication link had previously been established with the sensor module; and
   transmitting a first status message to a utility server indicating that the sensor module was previously out of communication with the intermediate communication device.

8. The method of claim 7, further comprising transmitting a second status message to the utility server indicating that the sensor module is not in communication with the intermediate communication device in response to determining that the previous communication link had not previously been established with the sensor module.

9. The method of claim 7, further comprising:
receiving a command authorizing the intermediate communication device to attempt to establish a communication link to the sensor module associated with the received advertisement signal; and
establishing a communication link with the sensor module in response to receiving the command.

10. An intermediate communication device, comprising:
a communication interface; and
an electronic processor configured to:
receive an advertisement signal from a sensor module;
transmit a response message in response to receiving the advertisement signal;
determine whether a previous communication link had previously been established with the sensor module;
establish a new communication link with the sensor module in response to determining that the previous communication link had previously been established with the sensor module; and
transmit a first status message to a utility server indicating that the sensor module was previously out of communication with the intermediate communication device.

11. The intermediate communication device of claim 10, wherein the electronic processor is configured to determine whether the advertisement signal is an expected advertisement signal.

12. The intermediate communication device of claim 10, wherein the electronic processor is further configured to transmit a second status message to the utility server indicating that the sensor module is not in communication with the intermediate communication device in response to determining that the previous communication link had not previously been established with the sensor module.

13. The intermediate communication device of claim 10, wherein the electronic processor is further configured to:
receive a command authorizing the intermediate communication device from a utility server device to attempt to establish a communication link to the sensor module associated with the received advertisement signal; and
establish a communication link with the sensor module in response to receiving the command.

14. The intermediate communication device of claim 10, wherein the sensor module comprises:
one or more sensors configured to sense one or more characteristics of a utility system;
a communication interface; and
an electronic processor in communication with the one or more sensors and the communication interface of the sensor module, and configured to:
broadcast the advertisement signal associated with a communication protocol for a first transmission time, wherein the advertisement signal is configured to cause the intermediate communication device to transmit the response message,
determine whether the response message is received within a predetermined time period, and
in response to determining that the response message is not received within the predetermined time period, operate in a modified sleep mode, wherein operating in the modified sleep mode comprises modifying an operation of the communication interface of the sensor module to broadcast the advertisement signal at a periodic interval, such that the advertisement signal is only broadcast at the periodic interval for a second transmission time, wherein the second transmission time is based on a voltage of a battery powering the sensor module.

15. The intermediate communication device of claim 14, wherein the sensor module determines the periodic interval based on a voltage of the battery.

16. The intermediate communication device of claim 14, wherein the second transmission time of the sensor module is less than the first transmission time.

17. The intermediate communication device of claim 14, wherein the electronic processor of the intermediate communication device is further configured to:
establish the new communication link with the intermediate communication device in response to receiving the response message within the predetermined time period,
determine whether the new communication link has been dropped,
attempt to renegotiate the new communication link with the intermediate communication device in response to determining that the new communication link was dropped,
determine whether the attempt to renegotiate the new communication link was successful, and
operate in the modified sleep mode in response to determining that the attempt to renegotiate the new communication link was not successful.

18. The intermediate communication device of claim 14, wherein the one or more sensors of the sensor module include a methane detection sensor.

* * * * *